(No Model.)
W. B. YOUNG.
WHEEL COLTER.
No. 256,941. Patented Apr. 25, 1882.
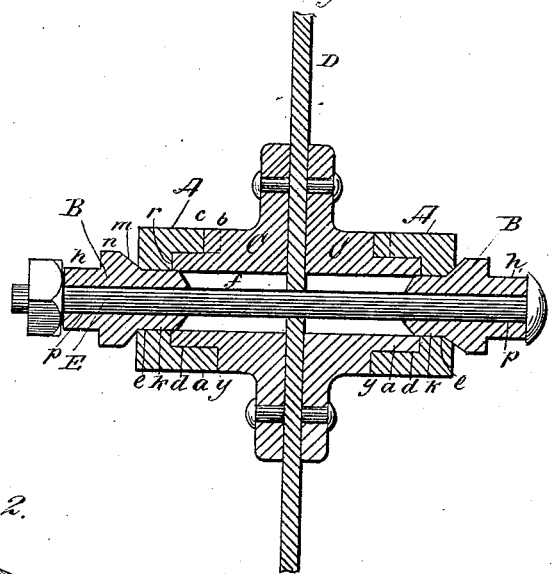
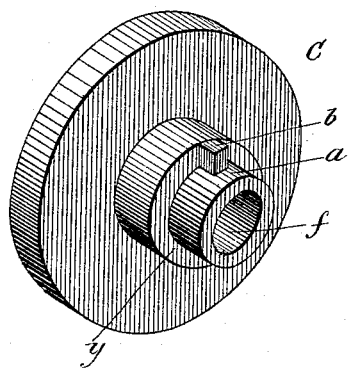
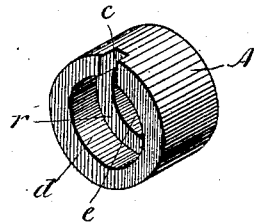
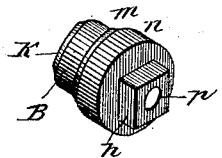
Witnesses
H. B. Hobart
M. E. Lane
Inventor:
William B. Young.
by John Lane.
His Atty.

UNITED STATES PATENT OFFICE.

WILLIAM B. YOUNG, OF ALTON, ILLINOIS, ASSIGNOR TO HAPGOOD PLOW COMPANY, OF SAME PLACE.

WHEEL-COLTER.

SPECIFICATION forming part of Letters Patent No. 256,941, dated April 25, 183:.

Application filed December 2, 1881. (No model.)

*To all whom it may concern:*

Be it known that I, WILLIAM B. YOUNG, of Alton, in the county of Madison and State of Illinois, have invented a new and useful Improvement in Wheel-Colters, which improvement is fully set forth in the following specification and accompanying drawings.

My invention relates to journaling wheel-colters.

Figure 1 is a central horizontal sectional view through the colter embodying my invention, showing how the cap-bush A and plug-bush B are arranged. Fig. 2 is a perspective view of the outer end of the boss C. Fig. 3 is a perspective view of the cap-bush A. Fig. 4 is a perspective view of the plug-bush B.

Referring to the drawings, D is a circular colter-blade, having a central hub or boss, as in ordinary common colters. The outer end of the boss C, I construct with a cylindrical part, $a$, with the shoulder $y$ and pin-clutch $b$, as shown in Fig. 2.

A is my improved removable cap-bush, having the recess $d$, with the slit $c$ and shoulder $r$, with a bearing part, $e$. The cap-bush A is seated around and over the end of the boss C by the part $a$, fitting into the recess $d$, and the clutch $b$, fitting into the slit $c$, as shown in Fig. 1.

B is the plug-bush, having a cylindrical part, $k$, on which the bearing $e$ is seated, also having the oblique shoulders $m$, bearing on the outer end of the cap-bush, also having a square part, $h$, to which the yoke may be connected.

In operation the cap-bush A covers the end of the boss C and is held in position by the clutch $b$, and is thereby caused to revolve with the colter. The plug-bush B furnishes a straight cylindrical bearing and also the oblique shoulder-bearing, as shown. The central bolt is closely fitting the perforation $p$ in the plug-bush, holding the plug-bush in line without wear to the bolt, and by tightening the nut on the bolt the parts are held snugly together, the colter pivoting on the shoulders $m$ and bearing $e$, and any loosening of the bolt cannot cause the colter to wabble, while the bearing $e$ is on the straight part $k$. The plug-bush B is held from rotating by the square part $h$ when seated in the colter-yoke.

I preferably make both bushings of hard white-metal, and both bushings, being removable, may, when worn, be changed for new at slight expense.

Having thus set forth my invention, I claim—

In a wheel-colter, a hub-boss having the bearing $a$, shoulder $y$, and clutch $b$, in combination with the cap-bush A, having the recess $d$, with slit $c$, shoulder $r$, and bearing $e$, and with the plug-bush B, having the bearing $k$, oblique shoulder $m$, and extension $h$, all arranged and operating substantially as and for the purpose set forth.

WILLIAM B. YOUNG.

Witnesses:
ROBERT HEWITT,
GEO. L. LOOMIS.